Patented May 4, 1937

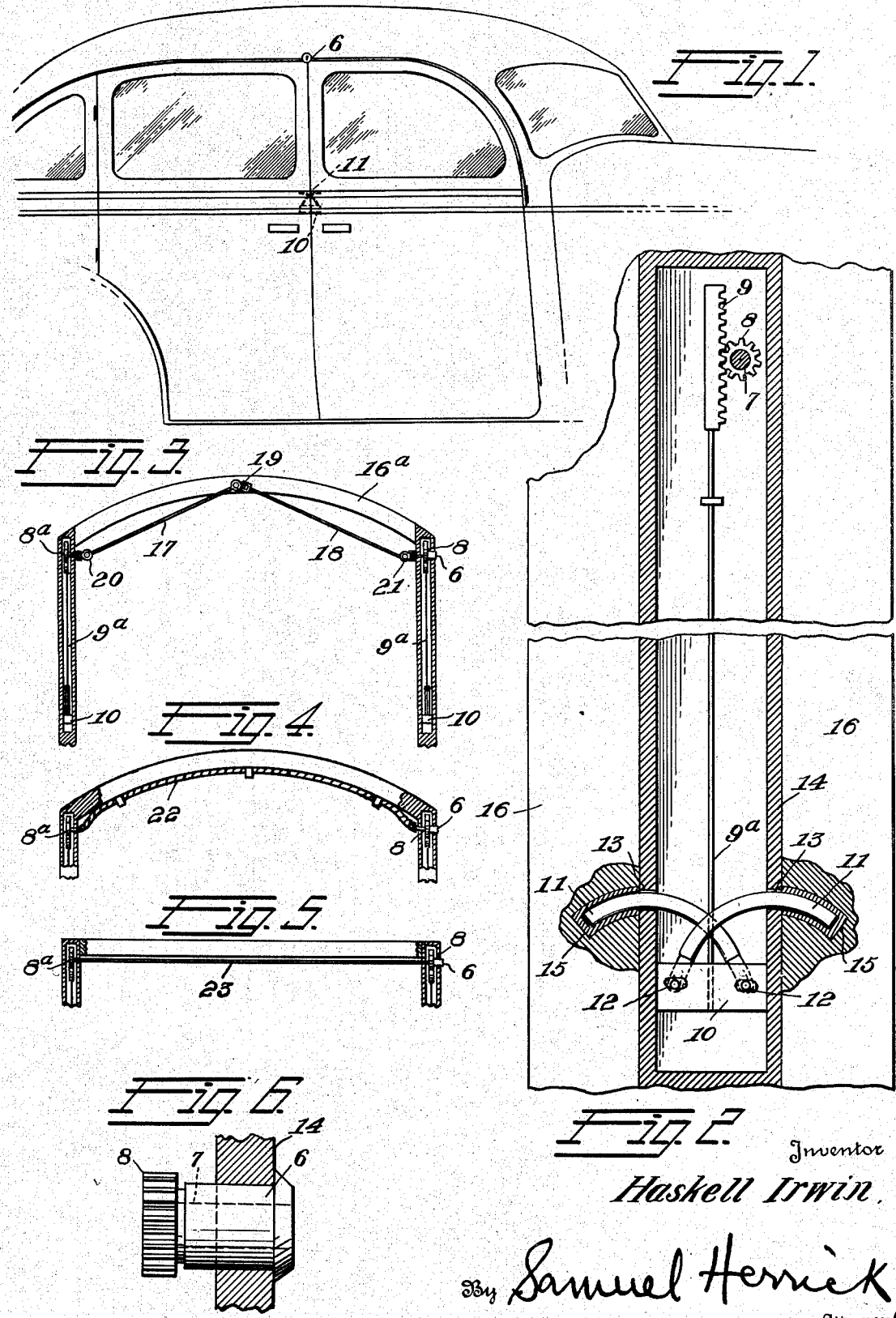

2,079,018

UNITED STATES PATENT OFFICE 2,079,018

MULTIPLE LOCKING MEANS FOR AUTOMOBILE DOORS

Haskell Irwin, Oklahoma City, Okla.

Application February 27, 1936, Serial No. 66,097

1 Claim. (Cl. 292—39)

This invention relates to a multiple lock control for the doors of automobiles, and it has for its object to provide means operable by a key and acting independently of the conventional locks of the automobile doors for manually locking or unlocking all of said doors from a single point.

It is a further object of the invention to provide a device of this character which cannot readily be unlocked from the interior of the car body, so that even if a thief should break a window and get access to the interior of a car, he could not reach in and unlock the car doors. Further objects and advantages of the invention will be set forth in the detailed description which now follows.

In the accompanying drawing:

Figure 1 is a fragmentary perspective view of a portion of an automobile body illustrating one point of application of the key-controlled lock through which the remaining locking elements are actuated;

Fig. 2 is an enlarged, lateral sectional view through one of the side posts of the automobile and its associated parts;

Fig. 3 is a transverse sectional view through one of the top bows of the automobile, showing one form of connection between the key-controlled lock and the parts upon the opposite side of the automobile;

Fig. 4 is a transverse sectional view showing another form of connection between the parts upon the opposite sides of the automobile;

Fig. 5 is a transverse sectional view through a straight top bow, and

Fig. 6 is an enlarged view of one form of lock cylinder with its attached spur gear.

Like numerals designate corresponding parts in all of the figures of the drawing.

In the particular form of the invention which I have chosen for purposes of illustration, a conventional form of key-controlled, cylinder lock 6 carries upon the inner end of its rotative part 7, a spur gear 8. Partial rotation of this gear occurs when the key (not shown) is turned in the lock. The gear meshes with a vertical rack bar 9, said bar being connected at its lower end to a block 10, through the medium of a connecting rod or cable 9a. Curved bolts 11 are pivotally connected at 12 to the block 10, and these bolts pass through guide openings 13 formed in the meeting rail or side post 14 of the car body.

When the gear is turned to the right in Fig. 2, the rack bar 9 and block 10 are elevated, and the bolts 11 are projected outwardly into keepers 15 embedded in the door frames indicated at 16 and which represent those portions of the door frames at the free or swinging side of the doors. The post 14 is the post against which the doors abut in their closing movements.

It is to be understood that the structure of Fig. 2 is duplicated upon the opposite side of the car body, the gear upon the far side of the car body being actuated through any one of a number of suitable types of connections extending, preferably, through or along a top bow 16a of the car body.

In the particular form of connection illustrated in Fig. 3, the connections comprise inclined shafts 17 and 18, connected at their central portions by any suitable type of universal joint 19 and universal joints 20 and 21 which connect said inclined shafts with their respective gears 8 and a corresponding gear 8a at the far side of the car body.

In Fig. 4, this transverse connection between the two gears 8 and 8a is shown as comprising a simple, flexible wire or cable 22 of the type in common use. In Fig. 5, the gears 8 and 8a are shown as being connected by a straight shaft 23. This arrangement may be used where the configuration of a car body permits of it.

It is to be understood that the invention is not limited to any particular location of the lock 6 nor to any particular length of connecting rods between racks 9 and blocks 10. These may be made of any length, and they may include flexible cables, so that the bolts 11 need not be in a straight line with the gear. Thus, I am able to locate the bolts 11 and the lock 6 at whatever point may be most advantageous in view of the shape and construction of the particular automobile to which it is applied.

It is to be understood that the invention is not limited to the precise construction set forth, but that it includes within its purview whatever changes fairly come within either the terms or the spirit of the appended claim.

Having described my invention, what I claim is:

A lock for an automobile of the type comprising front and rear doors having a hollow meeting post against which the free edges of said doors abut and said doors having arcuate keepers in their front edges, said lock comprising a block mounted for vertical sliding movement in said hollow post, manually operable means for imparting vertical movement to said block, and a pair of bolts pivoted to said block at the opposite sides thereof and lying in crossed relation to each other and being of arcuate formation, the curvature of said bolts substantially conforming to the curvature of the keepers in said doors.

HASKELL IRWIN.